March 29, 1955  B. A. HONIG  2,705,079
ROLLER CONVEYOR WITH FREELY ROTATABLE ROLLERS
Filed March 27, 1952
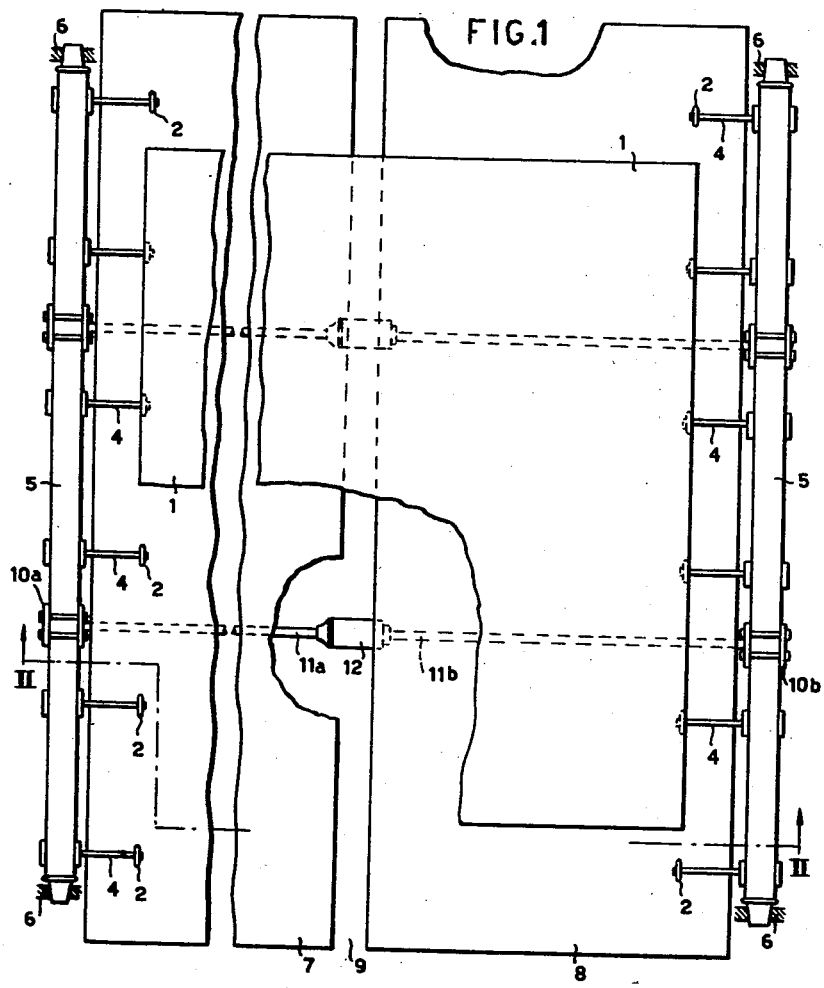
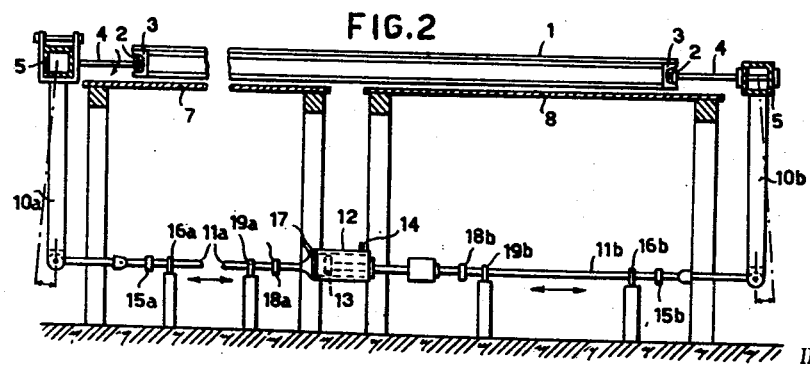
INVENTOR:
BERNARD ARNOLD HONIG
BY
ATTORNEY.

United States Patent Office 2,705,079
Patented Mar. 29, 1955

2,705,079

ROLLER CONVEYOR WITH FREELY ROTATABLE ROLLERS

Bernard A. Honig, De Steeg, Netherlands, assignor to N. V. Betonfabriek "De Meteoor," De Steeg, Netherlands, a limited liability company of the Netherlands Application March 27, 1952, Serial No. 278,926

2 Claims. (Cl. 214—1)

My invention relates to a roller conveyor with freely rotatable rollers.

An object of my invention is to provide a roller conveyor in which the shafts of the rollers are prevented from being damaged when subjected to concussions produced, for instance, by ramming, jerking or vibrating an article conveyed by said conveyor.

A further object of my invention is to provide a conveyor apparatus adapted to be inserted into a conveyor line provided with rollers for supporting and guiding an article which is to be subjected to special treatments which might give rise to damaging the rotatable rollers or their shafts and preventing such damaging by supporting the article on a fixed support.

Still a further object of my invention is to provide a conveyor apparatus in which the operator is able to release at will the supporting rollers from the load of the article to be conveyed.

As a further object a conveyor apparatus is provided in which the supporting rollers are freely rotatable on shafts which can be swung upwardly or downwardly by the operator or automatically when the article is subjected to a special treatment, thus supporting said article on a fixed support by downward swinging of the arms, while the shafts are swung upwardly in order to support the article again by said rollers after the treatment is finished.

A further object of my invention is to provide fluid pressure means for raising or lowering said rollers.

Still a further object of my invention is to provide adjustable means for limiting the uppermost and lowermost positions of said rollers.

These and other features of the invention will be best understood from the following description of a preferred embodiment of a conveyor apparatus according to the invention illustrated in the accompanying drawing exclusively by way of example.

Fig. 1 is a plan view of a conveyor apparatus according to the invention, some parts being broken away in order to show parts lying therebeneath, and Fig. 2 is a vertical section on the line II—II in Fig. 1.

The conveyor apparatus according to the invention is intended to substitute a part of a roller conveyor of any known design, having rollers for supporting and guiding pallets of a form to be described hereafter in connection with an embodiment of the conveyor apparatus according to the invention. Said pallets are adapted to carry articles, e. g. casting moulds, which are to be subjected to a special treatment, such as ramming, jerking, vibrating, etc. If these treatments are carried out while the pallets rest on the supporting rollers, the shafts of the rollers may be damaged due to the shocks or vibrations transmitted by the pallets.

The pallets for supporting the articles which are to be conveyed consist of a rectangular metal plate 1 forming a unit with a frame composed of U-beams 3. One flange of each of said beams is welded (or fixed in any other way) to the lower face of said plate 1, so that the central webs of the U-sections are vertical.

The side beams 3 of said frame are supported and guided by rollers 2 which are rotatably carried by shafts 4 fixedly secured to members 5 of box-shaped section. These box-members may be considered as shafts extending parallel to the direction of movement of the pallets and are rotatable in stationary bearings 6.

If the shafts 4 of the rollers 2 are in a horizontal position, a pallet carried by said rollers is guided in such a way that the frame is conveyed at some distance above tables 7 and 8. A space 9 is left between the tables 7 and 8 in order to provide a free passage for upright projections secured to a chain moving along the centre line of the conveyor and adapted to engage the pallets carried by the rollers. Since a chain with projections is a generally known implement in roller conveyors and does not form a part of the invention, it is not shown in the drawing. Moreover, the conveyor apparatus according to the invention may also be used without driving means, the pallets being pushed by hand one by one to the next place of operation.

Vertical arms 10a and 10b are fixed to the box-shaped shafts 5. The arm 10a arranged at one side of the conveyor apparatus is connected by a tie-rod 11a with a cylinder 12 while the arm 10b at the other side of the conveyor apparatus is connected by a tie rod 11b with a piston 13 which is movable in said cylinder 12. One end of said cylinder 12 is provided with a flexible connection 14 by means of which fluid pressure, e. g. compressed air, from a pressure line (not shown) running through the plant, can be admitted into the right hand end of the cylinder (according to Fig. 2). The fluid pressure urges the piston 13 to the left and the cylinder 12 to the right, so that by this relative movement the tie rod 11a is pulled to the right and the tie rod 11b is pulled to the left. In this way the lower ends of the arms 10a and 10b are pulled towards each other till collars 15a and 15b arranged on the tie rods 11a and 11b strike against guides 16a and 16b through which said tie rods are guided. Fig. 2 shows the position of the conveyor apparatus in which the shafts 4 are horizontal and the rollers 2 support the pallet 1, 3 and the arms 10a and 10b are vertical. Although in this position the collars 15a and 15b are in contact with the guides 16a and 16b they are represented for clearness sake in Fig. 2 at some distance from said guides.

If in the course of operations to which the article supported by the pallet 1, 3 it is to be subjected, it is desired to lower the said pallet till it rests on the tables 7 and 8, the flexible connection 14 is closed from the pressure line and is opened to the atmosphere. At the same time a second flexible connection 17 arranged at the other end of the cylinder 12 admits fluid pressure into the cylinder space at the left of the piston 13. This results in releasing the pulling force which up to then has been exerted on the tie rods 11a and 11b, and said rods are urged in opposite direction. The lower ends of the arms 10a and 10b are pushed outwardly, said outward movement being sustained by the weight of the pallet 1, 3 and of the article carried thereon. The arms 10a and 10b now assume positions indicated by the dot-and-dash lines in Fig. 2 representing their centre lines. Collars 18a and 18b arranged on the tie rods limit this outward movement by striking against guides 19a and 19b.

The collars 15a, 15b, 18a and 18b on the tie rods 11a and 11b are adjustable in longitudinal direction along said rods. Adjusting the collars 15a and 15b enables the operator to adjust the rollers 2 in their raised position exactly at the same height as the rollers of the (not shown) stationary parts of the conveyor preceding and succeeding the conveyor apparatus according to the invention. The adjustability of the collars 18a and 18b permits the operator to adjust the lowermost position of the rollers 2, such that, when the pallet 1, 3 rests on the tables 7 and 8, the rollers are either free from the lower and upper flanges of the U-beams 3 or, by altering the adjustment, exert a downward force on the lower flanges of said U-beams, thus pressing the pallet upon the tables 7 and 8.

The invention is not limited to the apparatus described in the above and shown in the drawing for raising and lowering the rollers. Although the illustrated embodiment has proved to be entirely satisfactory, it is also possible to support the shafts of the rollers in excentric members which are adapted to be rotated simultaneously, or to support said shafts by a lever mechanism which is adapted to raise or lower all shafts at the same time. Since these alternative constructions will be clear to any expert, a detailed description and an illustration are superfluous. It is further not required to support the articles which are to be treated by pallets, but said articles, e. g. casting moulds, may be provided with such grooves or guides that they can be supported directly by the rollers.

Having thus disclosed my invention and described in detail one embodiment thereof I claim:

1. In a roller conveyor apparatus for conveying over a stationary support an article provided at opposite sides thereof with upper and lower horizontal flanges, the combination of a pair of substantially horizontal carrier members, a plurality of shafts extending laterally from said members, rollers mounted on said shafts and adapted to engage the stated flanges, and means for rocking said members substantially about their longitudinal axes, whereby said rollers may selectively supportably engage the upper flanges to sustain the stated article in spaced relation above the stationary support and pressingly engage the lower flanges to hold the article in clamping engagement with the support.

2. The structure as set forth in claim 1 wherein said means for rocking said members are resilient for pressing said rollers in a yieldable clamping engagement with the lower flanges.

References Cited in the file of this patent

UNITED STATES PATENTS

| | | |
|---|---|---|
| 1,577,579 | Hirschler | Mar. 23, 1926 |
| 1,619,804 | Conklin | Mar. 8, 1927 |
| 2,012,478 | Oyster | Aug. 27, 1935 |
| 2,102,378 | Nicholls | Dec. 14, 1937 |
| 2,217,983 | Hopkins | Oct. 15, 1940 |
| 2,315,003 | Martin | Mar. 30, 1943 |